United States Patent
Kerler et al.

(10) Patent No.: US 10,315,548 B2
(45) Date of Patent: Jun. 11, 2019

(54) DEVICE FOR PNEUMATICALLY ADJUSTING A SEAT IN A MEANS OF TRANSPORT

(71) Applicant: Conti Temic microelectronic GmbH, Nuremberg (DE)

(72) Inventors: Alexander Kerler, Titting OT Petersbuch (DE); Johann Steinberger, Brunnen (DE); Wolfgang Thiel, Denkendorf (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/749,454

(22) PCT Filed: Jul. 20, 2016

(86) PCT No.: PCT/EP2016/067315
§ 371 (c)(1),
(2) Date: Jan. 31, 2018

(87) PCT Pub. No.: WO2017/021156
PCT Pub. Date: Feb. 9, 2017

(65) Prior Publication Data
US 2018/0222370 A1    Aug. 9, 2018

(30) Foreign Application Priority Data

Jul. 31, 2015 (DE) .................. 10 2015 214 569

(51) Int. Cl.
*F16K 99/00* (2006.01)
*B60N 2/90* (2018.01)
(Continued)

(52) U.S. Cl.
CPC .............. *B60N 2/914* (2018.02); *B60N 2/02* (2013.01); *B60N 2/665* (2015.04);
(Continued)

(58) Field of Classification Search
CPC ......... F16K 99/0049; Y10T 137/86831; Y10T 137/87917; Y10T 137/87925; B60N 2/914; B60N 2/02; B60N 2/665
(Continued)

(56) References Cited

U.S. PATENT DOCUMENTS

| 4,840,425 A * | 6/1989 | Noble | ................... A47C 7/467 |
| | | | 297/284.1 |
| 7,537,197 B2 * | 5/2009 | Heim | .................. F16K 99/0001 |
| | | | 239/601 |

(Continued)

FOREIGN PATENT DOCUMENTS

| DE | 10063478 A1 | 7/2002 |
| DE | 10257549 B3 | 8/2004 |

(Continued)

OTHER PUBLICATIONS

International Search Report and Written Opinion dated Oct. 20, 2016 from corresponding International Patent Application No. PCT/EP2016/067315.

(Continued)

*Primary Examiner* — Matthew W Jellett

(57) ABSTRACT

The invention relates to a device for the pneumatic adjustment of a seat in a means of transport, in particular in a motor vehicle, comprising one or more cushions (3) which can be filled with air and which are connected via one or more valves (1) to a compressed-air supply (2), and a control device for the actuation of the one or more valves (1) for the purposes of changing the filling state of the one or more cushions (3). The device according to the invention is characterized in that a respective valve (1) of at least some of the valves (1) comprises one or more actuation elements (4) composed of electroactive polymer, to which an electrical voltage can be applied. By application of the electrical voltage, a respective actuation element (4) is deformed, and in this way, one or more passage openings (6, 6') via which an exchange of compressed air with at least one cushion (3) takes place is or are opened up or shut off.

9 Claims, 2 Drawing Sheets

(51) Int. Cl.
*B60N 2/02* (2006.01)
*B60N 2/66* (2006.01)
*F16K 31/00* (2006.01)

(52) U.S. Cl.
CPC ........ *F16K 99/0049* (2013.01); *F16K 31/004* (2013.01); *Y10T 137/86831* (2015.04); *Y10T 137/87917* (2015.04); *Y10T 137/87925* (2015.04)

(58) Field of Classification Search
USPC .................................................... 251/129.06
See application file for complete search history.

(56) References Cited

U.S. PATENT DOCUMENTS

| | | | | |
|---|---|---|---|---|
| 8,222,799 | B2 * | 7/2012 | Polyakov | ............. G06F 3/0202 310/365 |
| 2004/0108479 | A1 * | 6/2004 | Garnier | ................. B81B 3/0035 251/129.01 |
| 2009/0250021 | A1 * | 10/2009 | Zarrabi | ................... F01L 1/352 123/90.11 |
| 2010/0176322 | A1 | 7/2010 | Heim et al. | |

FOREIGN PATENT DOCUMENTS

| | | |
|---|---|---|
| DE | 102006005517 B3 | 3/2007 |
| DE | 60119970 T2 | 5/2007 |
| DE | 102009047834 A1 | 4/2010 |
| DE | 102012203480 A1 | 9/2013 |
| DE | 102012212686 A1 | 1/2014 |
| DE | 112011105500 T5 | 8/2014 |
| WO | 2014/135909 A1 | 9/2014 |

OTHER PUBLICATIONS

Office Action dated Apr. 27, 2016 for corresponding German Patent Application No. 10 2015 214 569.7.

* cited by examiner

DEVICE FOR PNEUMATICALLY ADJUSTING A SEAT IN A MEANS OF TRANSPORT

The invention relates to a device for the pneumatic adjustment of a seat in a means of transport.

In means of transport, such as for example motor vehicles or also rail vehicles or aircraft, use is increasingly made of devices for pneumatic seat adjustment. In such devices, inflatable elastic cushions or bladders are used for shaping seat contours or for massaging purposes. These permit an individual adaptation of the seats to the occupant.

The filling and emptying of cushions in devices for pneumatic seat adjustment is performed by means of the actuation of suit-able valves. Here, use is made inter alia of piezo valves which, despite having a short adjustment travel, require a high voltage for the actuation thereof, and which are expensive to produce.

It is furthermore known for electromagnetic valves to be used in devices for pneumatic seat adjustment. Said valves, while taking up the same structural space as piezo valves, are considerably heavier and are composed of a multiplicity of individual parts which must be coordinated with one another. Furthermore, the generation of noise during the switching of such valves is relatively great.

In devices for pneumatic seat adjustment, use is also made of valves based on shape memory alloys (SMA=Shape Memory Alloy). Here, exceedance of a temperature point causes a deformation of the metal alloy, and a switching function in the valve is realized in this way. Documents DE 102 57 549 B3, DE 10 2012 212 686 A1 and WO 2014/135909 A1 disclose examples of SMA valves for the filling of air cushions in vehicle seats. SMA valves have the disadvantage that, owing to necessary cooling times, the actuator speed is reduced, and furthermore, a relatively large structural space is required in order to realize the required movements of the valves.

Document DE 10 2009 047 834 A1 discloses a pressure relief valve between the interior compartment and the outside of a motor vehicle using electroactive polymers. Furthermore, document DE 601 19 970 T2 generally describes valves composed of electroactive polymers.

It is an object of the invention to provide a device for the pneumatic adjustment of a seat in a means of transport, which device is of compact construction and permits straightforward filling and emptying of corresponding cushions.

Said object is achieved by means of the device as per patent claim 1. Refinements of the invention are defined in the dependent claims.

The device according to the invention for the pneumatic adjustment of a seat in a means of transport is, in a preferred variant, used for a motor vehicle seat. The device may for example be a lumbar support and/or a massaging device for the person on the corresponding seat. The device comprises one or more cushions or bladders which can be filled with air and which are connected via one or more valves to a compressed-air supply, and a control device for the actuation of the one or more valves for the purposes of changing the filling state of the one or more cushions.

The device according to the invention is characterized in that a respective valve of at least some of the valves comprises one or more actuation elements composed of electroactive polymer, to which an electrical voltage can be applied, wherein, by application of the electrical voltage, a respective actuation element is deformed, and in this way, one or more passage openings via which an exchange of compressed air with at least one cushion takes place is or are opened up or alternatively shut off. Conversely, when no electrical voltage is applied, the passage opening or the passage openings is or are shut off or alternatively opened up, which is effected by the reversal of the deformation of the respective actuation element.

According to the invention, valves based on electroactive polymers are used for the first time in a device for pneumatic seat adjustment in a means of transport. Electroactive polymers are known per se from the prior art. In the device according to the invention, as materials for said polymers, use may for example be made of the polymers mentioned in document DE 601 19 970 T2. In a particularly preferred variant, as electroactive polymer, use is made of a dielectric elastomer which is preferably formed as a foil. Said elastomer comprises a dielectric elastic layer, composed for example of silicone or acrylic, on the two sides of which there is arranged in each case one electrically conductive layer, for example a graphite layer. Application of an electrical voltage to said layers causes a compression of the elastic material situated in between, and thus a deformation of the elastomer.

The device according to the invention has the advantage that valves composed of electroactive polymer are of very compact construction, whereby the dimensions of the device are reduced. Furthermore, such valves permit precise actuation in a large thermal working range. Furthermore, such valves exhibit low actuation noises.

In a particularly preferred embodiment, the control device of the seat adjustment means according to the invention comprises one or more control units which has or have in each case one housing in which one or more circuit boards is or are arranged. The control functionalities of the control unit are realized by means of the circuit boards. Here, in a preferred variant, a respective valve is arranged on the or one of the circuit board(s), wherein the valves may possibly be distributed over multiple circuit boards. The passage opening or passage openings of the respective valve is or are preferably formed in the circuit board on which the valve is situated. A straightforward integration of corresponding valves in a control unit is achieved in this way.

In a further variant of the device according to the invention, the one or more actuation elements of at least one valve is or are each formed from a flat dielectric elastomer foil which is arranged on one side of the circuit board over the passage opening or the passage openings of the valve and which is electrically contacted, preferably on the circuit board, for the application of the electrical voltage. Here, application of the electrical voltage causes a lift-off of the flat dielectric elastomer foil from the circuit board for the purposes of opening up the passage opening or the passage openings, or alternatively causes a lowering of the flat dielectric elastomer foil for the purposes of shutting off the passage opening or the passage openings. In this way, a particularly compact construction of corresponding valves in the device for pneumatic seat adjustment is achieved.

In one variant of the embodiment described immediately above, a valve seat is arranged in at least one passage opening of the at least one valve. Said valve seat protrudes out of the passage opening on that side of the circuit board on which the flat dielectric elastomer foil is arranged, such that the flat dielectric elastomer foil makes abutting contact there when shutting off the passage opening. A reliable shut-off function of the valve is ensured in this way.

In a further preferred variant of the device according to the invention, the one or more actuation elements of at least one valve is or are each formed from a wound dielectric elastomer foil which is arranged on one side of the circuit board and which is electrically contacted, preferably on the circuit board, for the application of the electrical voltage. Application of the electrical voltage causes a deformation of the wound dielectric elastomer foil for the purposes of opening up or shutting off the one or more passage openings. The use of a wound dielectric elastomer foil permits a very good actuation capability of the corresponding valves.

In a preferred variant of the embodiment discussed immediately above, the wound dielectric elastomer foil is a cylinder which bears with one face side against the circuit board, wherein application of the electrical voltage causes a change in the diameter of the cylinder for the purposes of opening up or shutting off the one or more passage openings.

In a further preferred embodiment, the passage opening or the passage openings (in the open state) connect(s) ducts which are formed in the housing of at least one control unit and which permit the transport of compressed air to and away from at least one cushion. A compact design of the housing and thus a compact structural form of the control unit are made possible in this way.

The invention furthermore relates to the use of one or more valves comprising in each case one or more actuation elements composed of electroactive polymer in a device for the pneumatic adjustment of a seat in a means of transport, in particular in a motor vehicle. The valves may be designed on the basis of one or more of the above-described preferred embodiments. The device for pneumatic seat adjustment in which said valves are used comprises one or more cushions which can be filled with air and which are connected via the one or more valves to a compressed-air supply, and a control device for the actuation of the one or more valves for the purposes of changing the filling state of the one or more cushions.

Exemplary embodiments of the invention will be described in detail below on the basis of the appended figures.

Below, different variants of valves composed of electroactive polymer will be described, which are installed in a device for the adjustment of a motor vehicle seat. Here, the valves serve for permitting the supply of compressed air to corresponding cushions in a vehicle seat, and ensuring the discharge of compressed air from the conditions. In this way, the vehicle seat can be adapted to the geometry of the occupant sitting thereon.

Figure 1:
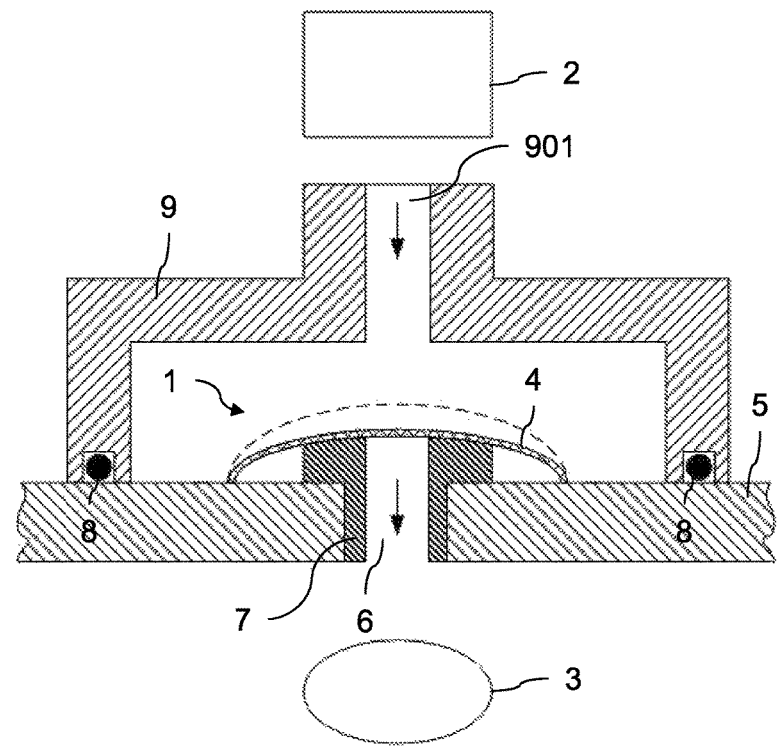
FIG. 1 shows a sectional view of a valve which is installed in an embodiment of the device according to the invention.

FIG. 1 shows a sectional view of a first embodiment of a valve installed in the seat adjustment means according to the invention. The valve is denoted by the reference designation 1, and is situated between a compressed-air supply 2 and a cushion 3 integrated in the motor vehicle seat. The compressed-air supply 2, which preferably comprises a compressor, and the cushion 3 are indicated merely schematically. In the variants described here, the seat adjustment means according to the invention comprises multiple cushions and corresponding valves, wherein the figures discussed below always show only one of said valves with correspondingly associated air cushions.

For the control of the actuation of the valves, a control unit is provided which has corresponding connections to the compressed-air supply and to the cushion. The control unit is for example integrated in the backrest of the vehicle seat. In the following variants, the valves are installed in the control unit. The device for seat adjustment may possibly also comprise more than one control unit. For example, one control unit may be provided for realizing a massaging function in the motor vehicle seat, whereas another control unit serves purely for the static setting of the motor vehicle seat.

In the embodiment of FIG. 1, the valve 1 is arranged on a circuit board 5 which is provided in the housing of the control unit and by means of which the control of the actuation of the valves is performed. Here, FIG. 1 shows a cover 9, which forms a part of the housing of the control unit. Only a detail of the housing and of the circuit board is illustrated in FIG. 1 and also in FIGS. 2 and 3 described further below. The housing part 9 lies on the top side of the circuit board 5 and is sealed off with respect to said top side by means of corresponding seals 8. The supply of compressed air from the compressed-air supply 2 is made possible via a duct 901 in the housing part 9. The valve 1, which is of very compact and lightweight construction owing to the use of an electroactive polymer, is situated in the cavity formed between housing part 9 and circuit board 5. In this way, the structural space required in the control unit for the valve is reduced.

In the variant of FIG. 1, as electroactive polymer, a dielectric elastomer foil 4 is used which comprises an elastic dielectric layer with a conductive top side and bottom side. Said foil, like all electroactive polymers, has the characteristic that it deforms when a voltage is applied, wherein said deformation is reversed again as a result of a depletion of the voltage. In other words, the dielectric elastomer 4 acts as an elastic capacitor. When the voltage is applied between the conductive top and bottom sides of the elastomer, the electro-static attraction force causes the elastic layer in the elastomer to be compressed. If the voltage is subsequently discharged again as a result of a discharge of the capacitor, the original state of the elastomer is restored.

In the embodiment of FIG. 1, the dielectric elastomer 4 is arranged over a passage opening 6 in the circuit board 5. Said passage opening leads to the corresponding cushion 3. The conductive sides of the elastomer make contact with corresponding contacts on the circuit board, whereby electrical voltage can be applied to the elastomer for the deformation thereof. For the sake of clarity, the electrical contacting means is not shown in detail. A valve seat 7 with a cylindrical shape is arranged in the passage opening 6. Here, on the upper end of the valve seat, there is formed a flange, the bottom side of which lies on the top side of the circuit board 5. The top side of the flange serves for the abutment of the dielectric elastomer foil 4.

FIG. 1 shows the elastomer foil in a state without an applied voltage. In this state, the bottom side of the elastomer foil lies on the flange. This corresponds to the shut-off state of the valve, in which a passage of compressed air between the compressed-air supply 2 and the air cushion 3 is interrupted. For the opening of the valve, an electrical voltage is applied to the elastomer foil via the contacting means on the circuit board. As already mentioned, this leads to a compression of the elastic layer, which in turn leads to a lateral expansion of the elastomer foil and to the lift-off thereof.

The position of the elastomer foil when a voltage is applied is indicated in FIG. 1 by dashed lines. As can be seen, when voltage is applied, the elastomer foil lifts off from the valve seat 7 in an upward direction, whereby the passage opening 6 is opened. The compressed air can then, by flowing around the side of the foil, flow through the passage opening, as indicated by corresponding arrows in FIG. 1. Thus, as a result of the application of the voltage, the open state of the valve is assumed, in which the supply of compressed air from the compressed-air supply 2 to the corresponding cushion 3 is made possible. To maintain said state, the voltage to the elastomer foil does not need to be applied continuously, because the elastomer foil, owing to its function as a capacitor, stores the voltage. To cause the valve to close again, the voltage is dissipated again by means of a discharge of the capacitor, which leads to the lowering of the elastomer foil and the shutting-off of the passage opening 6.

Figure 2:
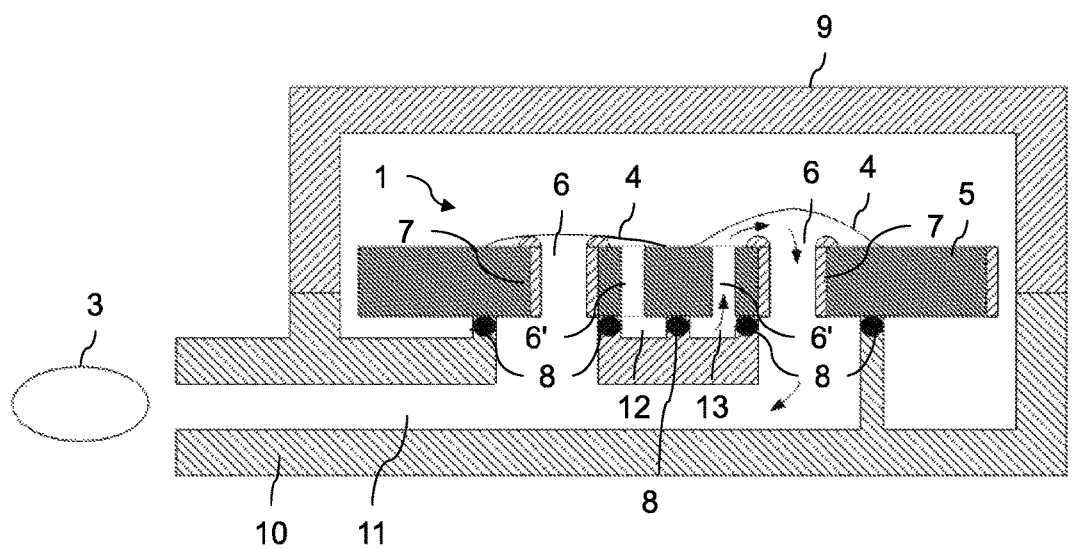
FIG. 2 shows a sectional view of a modified valve in an embodiment of the invention.

FIG. 2 shows a modification of the valve of FIG. 1. Said valve comprises two dielectric elastomer foils, whereby the function of a 3/3-way valve is achieved. The two elastomer foils 4 are in turn arranged on the top side of a circuit board 5, and are suitably contacted there for the application of a voltage. Analogously to FIG. 1, the elastomer foils are situated above respective passage openings 6, in which the same valve seat 7 as in FIG. 1 is arranged. By contrast to FIG. 1, a further passage opening 6' is provided below each of the elastomer foils 4.

The circuit board 5 is in turn situated in the housing of a corresponding control unit for seat adjustment. The housing comprises an upper part 9 and a lower part 10. The lower part bears, via corresponding seals 8, against the bottom side of the circuit board 5. In said lower part, there are formed ducts for conducting compressed air to and away from the air cushion 3, which is connected to the control unit via the left-hand outlet of the housing lower part 10. An air discharge duct 12 and an air feed duct 13 are formed in the housing lower part 10 in addition to a horizontally running duct 11. The air discharge duct leads to a deaeration opening (not shown) via which compressed air is discharged for the deaeration of the cushion. The air feed duct 13 leads to the corresponding compressed-air supply 2, which, for the sake of clarity, is not shown in FIG. 2.

In the scenario of FIG. 2, no voltage is applied to the left-hand dielectric elastomer foil 4. Accordingly, a connection of the air discharge duct 12 via the passage openings 6 and 6' to the duct 11 is shut off, such that no compressed air can emerge via the corresponding deaeration opening. By contrast to this, a voltage is applied to the right-hand elastomer foil 4, such that the latter lifts off from the valve seat 7 situated thereunder. As a result, a passage of compressed air from the air feed duct 13 via the passage openings 6' and 6 to the duct 11 is realized, as indicated by corresponding arrows. Accordingly, filling of the cushion 3 by means of the compressed-air supply 2 is made possible.

With the closed left-hand elastomer foil and the open right-hand elastomer foil, a first switching state of the 3/3-way valve is thus assumed, in which the filling of the cushion is effected. By contrast, when voltage is applied to neither of the two elastomer foils, a second switching state of the 3/3-way valve is assumed, in which the valve is shut off. In a third switching state of the valve, a voltage is applied only to the left-hand elastomer foil, whereas the right-hand elastomer foil has no voltage. As a consequence, a supply of compressed air from the compressed-air supply 2 to the cushion 3 is shut off, whereas the passage of compressed air from the cushion 3 via the line 11 via the passage openings 6 and 6' to the air discharge duct 12 and the corresponding deaeration valve is made possible, such that deaeration of the cushion is realized.

Figure 3:
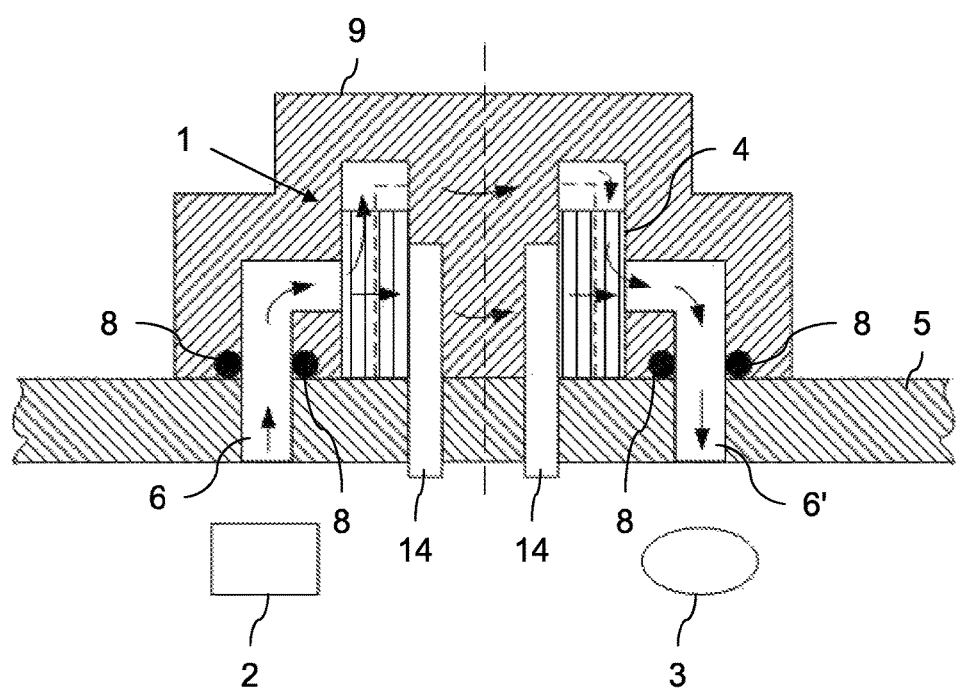
FIG. 3 shows a sectional view of a further modification of a valve in an embodiment of the device according to the invention.

FIG. 3 shows a third variant of a valve in a device for the adjustment of a motor vehicle seat. By contrast to the preceding variants, a wound elastomer foil 4 is used instead of a flat elastomer foil. Here, the foil is wound to form a cylinder. In the illustrated cross section of the cylinder, between successive elastic layers, there is always situated a conductive surface, wherein the polarity of the conductive surface alternates from one layer to the next. This is achieved by means of the winding of two conductive layers of different polarity with elastic material situated in between.

Analogously to the preceding embodiments, the valve 1 of FIG. 3 is arranged on a circuit board 5, on the top side of which there is situated a housing part 9, which is sealed off with respect to the circuit board by means of corresponding seals 8. Furthermore, it is in turn the case that two passage openings 6 and 6' are formed in the circuit board 5. Compressed air is supplied from the compressed-air supply 2 via the passage opening 6, and compressed air passes to a corresponding air cushion 3 via the passage opening 6'. FIG. 3 furthermore shows the electrical contacting means 14 for the application of the voltage to the wound elastomer foil. The contacting means extend through corresponding openings in the circuit board 5 and are for example connected to contacts on the bottom side of the circuit board.

In the illustration of FIG. 3, no voltage is applied to the wound elastomer foil 4. In this way, corresponding ducts to the passage opening 6 and to the passage opening 6' are closed, such that the valve shuts off a passage of compressed air. Application of electrical voltage to the wound elastomer foil causes the latter to be compressed, such that the diameter thereof is reduced, and the height thereof is increased. This is indicated by dashed lines in FIG. 3. As can be seen, in this state, a passage of compressed air via the passage openings 6 and 6' and corresponding ducts in the housing 9 is made possible. In particular, owing to the reduced diameter, the compressed air can flow around the wound elastomer foil at its outer side and at its top side, such that compressed air can flow through the interior of the housing part 9 from the passage opening 6 to the passage opening 6'. This is indicated by corresponding arrows in FIG. 3. Thus, application of the voltage to the wound elastomer foil permits an opening of the valve and thus the supply of compressed air from the compressed-air supply 2 to the cushion 3.

The embodiments of the invention described above have numerous advantages. In particular, through the use of electroactive polymer, it is possible to realize compact and lightweight valves which are preferably integrated in the housing of a control unit of the device for seat adjustment, whereby the control unit can be reduced in size. At the same time, through the use of such valves, the actuation noise is considerably reduced, and proportional actuation of the valves can be realized over a large thermal working range. Furthermore, after the application of a voltage, the switching position of the valves can be maintained even without a further supply of voltage, until the voltage is dissipated by means of a corresponding discharge. In this way, a bistable control element can be realized.

LIST OF REFERENCE SIGNS

1 Valve
2 Compressed-air supply
3 Cushion
4 Actuation element
5 Circuit board
6, 6' Passage opening

7 Valve seat
8 Seal
9 Housing part
901 Opening in the housing part
10 Housing part
11, 12, 13 Ducts
14 Electrical contacting means

The invention claimed is:

1. A device for pneumatic adjustment of a seat in a transport, the transport comprising one or more cushions which can be filled with air and which are connected via one or more valves to a compressed-air supply, the device comprising:
   the one or more valves and
   a control device configured to actuate the one or more valves to change a filling state of the one or more cushions, wherein
   a respective valve of at least some of the one or more valves comprises one or more actuation elements comprised of an electroactive polymer, to which an electrical voltage can be applied, wherein, by application of the electrical voltage, a respective actuation element is deformed, so that one or more passage openings via which an exchange of compressed air with at least one cushion takes place is or are opened or shut off;
   wherein the one or more actuation elements of the at least one valve is or are each formed from a wound dielectric elastomer foil, the wound dielectric elastomer foil being a cylinder wherein application of the electrical voltage causes a diameter of the cylinder to be reduced and thus open the one or more passage openings.

2. The device as claimed in claim 1, wherein the one or more actuation elements of a respective valve is or are formed from an electroactive elastomer.

3. The device as claimed in claim 1, wherein the control device comprises one or more control units each having a housing in which one or more circuit boards is or are arranged.

4. The device as claimed in claim 3, wherein the respective valve is arranged on a circuit board.

5. The device as claimed in claim 4, wherein the passage opening or the passage openings of the respective valve is or are formed in the circuit board.

6. The device as claimed in one claim 5, wherein the one or more actuation elements of the at least one valve is or are each arranged on one side of the circuit board, the wound dielectric elastomer foil being electrically contacted on the circuit board for the application of the electrical voltage.

7. The device as claimed in claim 6, wherein the wound dielectric elastomer foil is a cylinder which bears with one face side against the circuit board.

8. The device as claimed in claim 5, wherein the passage opening or the passage openings connects or connect ducts formed in the housing of at least one control unit and which permit transporting of compressed air to and away from at least one cushion.

9. The device as claimed in claim 2, wherein the electroactive elastomer is in a form of a foil.

* * * * *